United States Patent
Lin (10) Patent No.: US 9,824,219 B2
(45) Date of Patent: Nov. 21, 2017

(54) ELECTRONIC DEVICE HAVING WAKE UP VERIFICATION AND ELECTRONIC SYSTEM HAVING THE ELECTRONIC DEVICE

(71) Applicant: INSYDE SOFTWARE CORP., Taipei (TW)

(72) Inventor: Wen-Ming Lin, Taipei (TW)

(73) Assignee: INSYDE SOFTWARE CORP., Taipei (TW)

( * ) Notice: Subject to any disclaimer, the term of this patent is extended or adjusted under 35 U.S.C. 154(b) by 94 days.

(21) Appl. No.: 14/714,632

(22) Filed: May 18, 2015

(65) Prior Publication Data

US 2015/0339481 A1 Nov. 26, 2015

(30) Foreign Application Priority Data

May 23, 2014 (TW) .............................. 103117986 A (51) Int. Cl.
*G06F 15/177* (2006.01)
*G06F 9/00* (2006.01)
*G06F 21/57* (2013.01)
*G06F 9/44* (2006.01)
*G06F 21/35* (2013.01)

(52) U.S. Cl.
CPC .......... *G06F 21/575* (2013.01); *G06F 9/4418* (2013.01); *G06F 21/35* (2013.01)

(58) Field of Classification Search
CPC ....... G06F 21/575; G06F 9/4418; G06F 21/35
See application file for complete search history.

(56) References Cited

U.S. PATENT DOCUMENTS

| | | | | |
|---|---|---|---|---|
| 7,378,939 B2 * | 5/2008 | Sengupta | ................ | H04M 1/67 340/5.53 |
| 8,866,581 B1 * | 10/2014 | Leblang | .............. | H04L 63/0853 713/186 |
| 9,021,565 B2 * | 4/2015 | Novack | ................ | H04L 9/3231 713/186 |
| 2002/0002539 A1 * | 1/2002 | Fahraeus | ............. | G06F 3/03545 705/51 |
| 2009/0083534 A1 * | 3/2009 | Challener | ............. | G06F 21/305 713/2 |

(Continued)

OTHER PUBLICATIONS

English Translation of JP 10222241.*

*Primary Examiner* — Xuxing Chen
(74) *Attorney, Agent, or Firm* — Rabin & Berdo, P.C.

(57) ABSTRACT

An electronic system having wake up verification comprises an electronic device and a mobile device. The electronic device wirelessly connects to the mobile device. When the mobile device executes a verification program, the mobile device provides a sampling signal input interface on which a user can input a sampling signal. When the sampling signal is input, the mobile device transforms the sampling signal into sampling data and transmits the sampling data to the electronic device. The electronic device verifies the sampling data. When the sampling data are correct, the electronic device executes an operation system. When the sampling data are incorrect, the electronic device cannot execute the operation system. Therefore, information stored in the electronic device can be protected by two factor authentication to increase reliability for safeguarding information.

15 Claims, 8 Drawing Sheets

(56) References Cited

U.S. PATENT DOCUMENTS

| | | | |
|---|---|---|---|
| 2010/0122076 A1* | 5/2010 | Witty | G06F 21/575 |
| | | | 713/2 |
| 2011/0246757 A1* | 10/2011 | Prakash | G06F 21/305 |
| | | | 713/2 |
| 2012/0084571 A1* | 4/2012 | Weis | G06F 21/34 |
| | | | 713/184 |
| 2013/0173925 A1* | 7/2013 | Yen | G06F 21/32 |
| | | | 713/186 |
| 2014/0006765 A1* | 1/2014 | Saito | G06F 21/572 |
| | | | 713/2 |
| 2016/0147271 A1* | 5/2016 | Brown | G06F 1/26 |
| | | | 713/330 |

* cited by examiner

ELECTRONIC DEVICE HAVING WAKE UP VERIFICATION AND ELECTRONIC SYSTEM HAVING THE ELECTRONIC DEVICE

BACKGROUND OF THE INVENTION

1. Field of the Invention

The present invention relates to an electronic device, and particularly to an electronic device having a function of wakeup verification.

2. Description of the Related Art

When a power button of an electronic device is pressed by a user, the electronic device can be booted or waked up from a standby mode to execute an operation system of the electronic device. The electronic device may be a personal computer, a notebook computer, a tablet computer, or a smart phone. The electronic device saves private information or classified information not to be known by other persons. When the electronic device is lost, the private information and the classified information saved in the electronic device may be accessed by other persons, and confidentiality of the information is broken. Then, accounts of the user of the electronic device may be hacked, which may even incur financial loss.

The electronic device can verify whether the user is authorized by a password. When the power button is pressed, the electronic device is booted, and then the electronic is locked and does not execute the operating system. The user can input a password on an input interface. When the password is correct, the electronic device executes the operation system, and the user can use the electronic device. The password may a series of numbers or a graphic password. Other persons can peek at the password from behind the user, and the password is known by the other persons. Then the persons can steal the information saved in the electronic device even though the electronic device is locked by the password.

Another technique for verifying the user of the electronic device is connecting identification through Bluetooth. When an authorized mobile device connects to the electronic device through Bluetooth, the electronic device can execute the operation system. In other words, the mobile device is located near the electronic device. When the electronic device is booted or waked up from a standby mode, the electronic device is locked and connects to the mobile device through Bluetooth. When the electronic device is connected with the mobile device successfully, the mobile device transmits verification signal to the electronic device. The electronic device verifies the verification signal, and when the verification signal is authorized, the electronic device is unlocked and executes the operation system.

Therefore, the mobile device needs to be located near the electronic device such that the electronic device can execute the operation system. Reliability for safeguarding the information saved in the electronic device is raised. However, when the mobile device and the electronic device are both stolen at the same time, the information is still exposed to risk of leakage.

SUMMARY OF THE INVENTION

An objective of the present invention is to provide an electronic device having wake up verification and an electronic system having the electronic device to raise reliability for safeguarding information saved in the electronic device.

To achieve the foregoing objective, the electronic system having wake up verification comprises an electronic device and a mobile device. The electronic device comprises a first storage unit, a second storage unit, a wireless module, an embedded controller, and a processor. The first storage unit stores verification data. The second storage unit stores an operation system. The wireless module wirelessly connects to the mobile device. The embedded controller detects a boot signal. The processor is electrically connected to the first storage unit, the second storage unit, the wireless module, and the embedded controller. When the embedded controller detects the boot signal, the processor executes a boot firmware, and the processor wirelessly connects to the mobile device through the wireless module to read a sampling data from the mobile device. The processor further compares the sampling data with the verification data stored in the first storage unit to verify the sampling data. When the sampling data is same as the verification data, the processor executes the operation system stored in the second storage unit.

When the electronic device verifies the sampling data and the sampling is correct, the electronic device executes the operation system, and the user can access private information saved in the electronic device. The sampling data may be a special movement detected by a g-sensor or a gesture detected by a touch screen. The sampling data is only known by the user. Therefore, even though the electronic device and the mobile device are lost at the same time, the information saved in the electronic device would not be accessed by unauthorized users. Reliability for protecting information saved in the electronic device is further increased.

Other objectives, advantages and novel features of the invention will become more apparent from the following detailed description when taken in conjunction with the accompanying drawings.

DETAILED DESCRIPTION OF THE INVENTION

Figure 1:
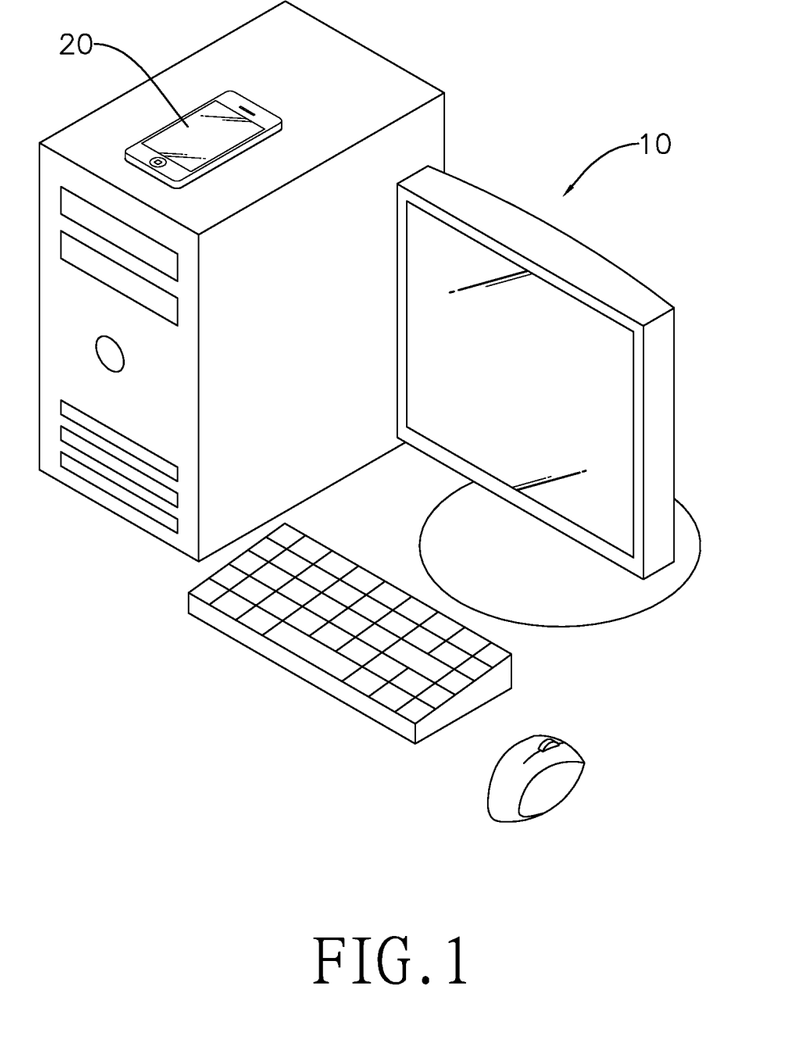
FIG. 1 is a schematic view of an electronic system having a function of wake up verification.
Figure 2:
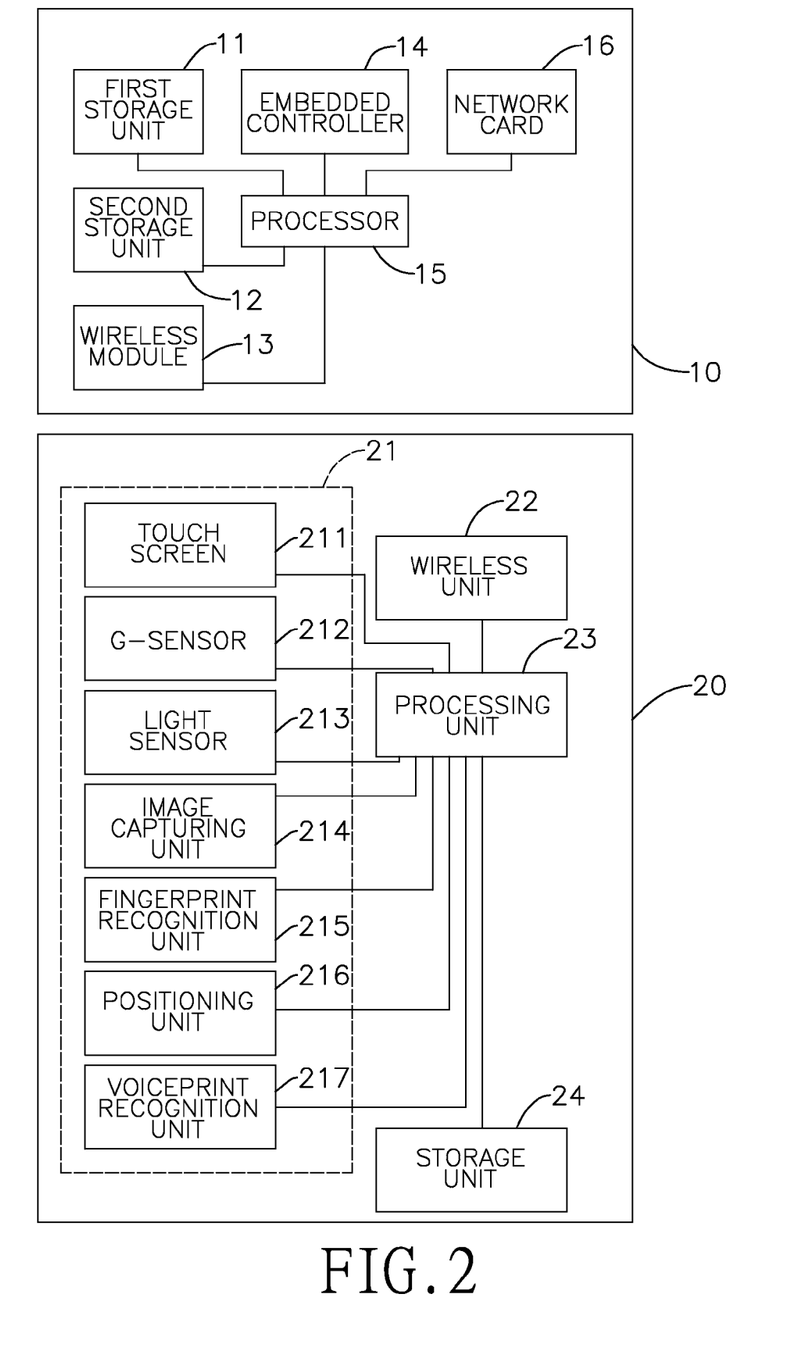
FIG. 2 is a block diagram of an electronic system having a function of wake up verification.

With reference to FIGS. 1 and 2, the present invention is an electronic system having a function of wake up verification. The electronic system comprises an electronic device 10 and a mobile device 20. When the electronic system is in use, the mobile device 20 needs to be put near the electronic device 10, and the mobile device 20 is within an effective area of wireless connection between the electronic device 10 and the mobile device 20.

The electronic device 10 comprises a first storage unit 11, a second storage unit 12, a wireless module 13, an embedded controller 14, and a processor 15. The first storage unit 11 stores verification data. The second storage unit 12 stores an operation system. The wireless module 13 wirelessly connects to the mobile device 20. The embedded controller 14 detects a boot signal. The processor 15 is electrically connected to the first storage unit 11, the second storage unit 12, the wireless module 13, and the embedded controller 14. When the embedded controller 14 detects the boot signal, the processor 15 executes a boot firmware, and the processor 15 wirelessly connects to the mobile device 20 through the wireless module 13 to read a sampling data from the mobile device 20. The processor 15 further compares the sampling data with the verification data stored in the first storage unit 11 to verify the sampling data. When the sampling data is same as the verification data, the processor 15 executes the operation system stored in the second storage unit 12.

The first storage unit 11 further stores an identification number. When the processor 15 executes the boot firmware and wirelessly connects to the mobile device 20 through the wireless module 13, the processor 14 firstly reads a device identification of the mobile device 20 and compares the device identification with the identification number to verify the device identification.

When the device identification is same as the identification number stored in the first storage unit 11, the processor 14 reads the sampling data from the mobile device 20, and compares the sampling data with the verification data stored in the first storage unit 11 to verify the sampling data.

In the embodiment, the boot firmware may be a basic input/output system (BIOS) firmware, an unified extensible firmware interface (UEFI) BIOS firmware, or an OS boot loader firmware. A communication protocol between the mobile device 20 and the wireless module 13 may be near field communication (NFC), Wi-Fi, or Bluetooth. A size of the effective area of wireless connection between the electronic device 10 and the mobile device 20 depends on the type of the communication protocol.

The boot signal may result from pressing a power button of the electronic device 10. The electronic device 10 further comprises a network card 16. The network card 16 is electrically connected to the embedded controller 14. Therefore, the electronic device 10 further has a Wake-On-LAN function. A remote device or the mobile device 20 can transmit a boot packet to the network card 16 of the electronic device 10 through the Internet. When the network card 16 receives the boot packet, the network card 16 generates the boot signal, and the embedded controller 14 can detect the boot signal. Therefore, the boot signal may result from the boot packet transmitted by the remote device or the mobile device 20 through the Internet, and the electronic device 10 can be booted from anywhere.

In the embodiment, the mobile device 20 executes a verification program stored in the mobile device 20 to boot the electronic device 10 through the Internet and to sample the sampling data. In the other embodiment, when the mobile device 20 executes the verification program, the mobile device 20 directly samples the sampling data and stores the sampling data in a register (not shown in the figures) of the mobile device 20. When the electronic device 10 detects the boot signal, the electronic device 10 wirelessly connects to the mobile device 20, reads the device identification, and verifies the device identification. When the device identification is correct, the electronic device 10 further reads the sampling data stored in the register to verify the sampling data.

The mobile device 20 comprises at least one sampling unit 21, a wireless unit 22, a processing unit 23, and a storage unit 24. The storage unit 24 stores the device identification. The wireless unit 22 wirelessly connects to the wireless module 13 of the electronic device 10. The sampling unit 21 samples a motion of the user and generates a sampling signal according to the motion. The processing unit 23 is electrically connected to the sampling unit 21, the wireless unit 22, and the storage unit 24. The processing unit 23 generates the sampling data according to the sampling signal, and transmits the sampling data to the electronic device 10 through the wireless unit 22. In the embodiment, the sampling unit 21 may be a touch screen 211, a g-sensor 212, a light sensor 213, an image capturing unit 214, a fingerprint recognition unit 215, a positioning unit 216, a voiceprint recognition unit 217, or other units that can offer the user to input a password or can detect a motion of the user.

The mobile device 20 is wirelessly connected to the electronic device 10 to transmit the device identification, and generates the sampling data according the motion of the user. For example, the user can input a verification gesture on the touch screen 211, and the touch screen 211 detects the verification gesture. The processing unit 23 generates the sampling data according to the verification gesture, and transmits the sampling data to the electronic device 10 through the wireless unit 22.

The user can hold the mobile device 20 to move in a particular way, such as shaking for five times. The g-sensor 212 detects a gravity sensing signal according to a motion of the user, and generates the sampling signal according to the gravity sensing signal.

The user can perform a particular behavior to the light sensor 213, such as blinking the light sensor 213 for five times. The light sensor 213 senses the particular behavior to detect a light sensing signal, and generates the sampling signal according to the light sensing signal.

The image capturing unit 214 can capture an image, such as a face image of the user to recognize biological features of the user or an image of a particular space to recognize positions of objects in the particular space. The processing unit 23 generates the sampling data according to the image.

The user can press a finger on the fingerprint recognition unit 215. The fingerprint recognition unit 215 recognizes a fingerprint of the user, and generates the sampling signal according to the fingerprint.

The positioning unit 216 can detect location based services (LBS) information of the mobile device 20, and generates the sampling signal. In the embodiment, the positioning unit 216 is a GPS module e and generates a GPS signal. The processing unit 23 generates the sampling data, i.e. location based information, according to the sampling signal, i.e. GPS signal. The mobile device 20 directly samples the sampling data and stores the sampling data in a register (not shown in the figures) of the mobile device 20. When the electronic device 10 detects the boot signal, the electronic device 10 wirelessly connects to the mobile device 20, reads the device identification, and verifies the device identification. When the device identification is correct, the electronic device 10 further reads the location based information stored in the register to verify the location based information. When the mobile device 20 is near the electronic device 10 or the mobile device 20 and the electronic device 10 are both in a pre-defined location, the result of the verification of the location based information will be correct. The electronic device 10 only can read and execute the operation system when the result of the verification is correct.

The user can say a word or phrase to the voiceprint recognition unit 217. The voiceprint recognition unit 217 recognizes a voiceprint of the user, and generates the sampling signal according to the voiceprint.

The sampling signal is generated by biological features of the user, by a particular gesture, or by a particular motion. Therefore, other persons cannot easily know the gesture or the motion, and cannot easily imitate the biological features. The information saved in the electronic device 10 cannot be accessed and stolen by unauthorized persons.

Figure 3:
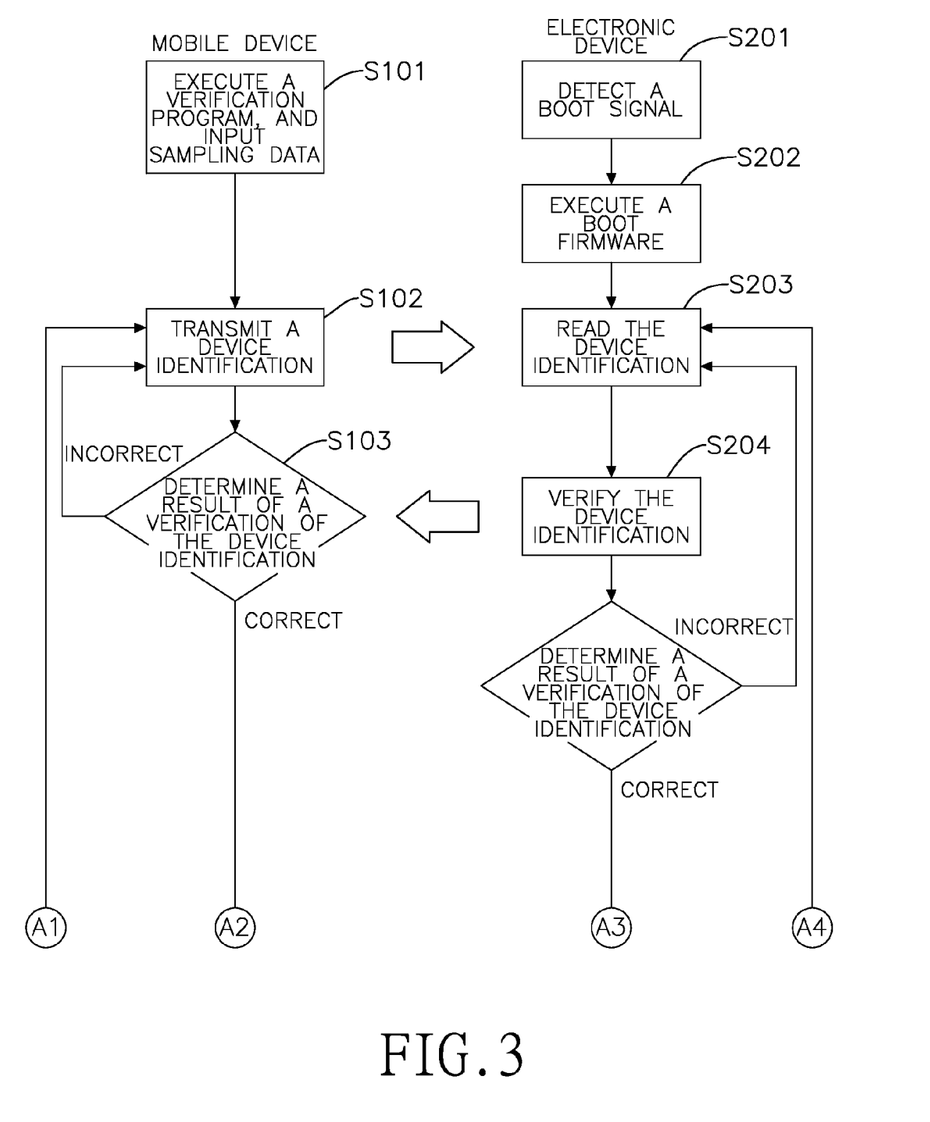
FIGS. 3 and 4 is flow diagrams of a first embodiment of an electronic system having a function of wake up verification.
Figure 4:
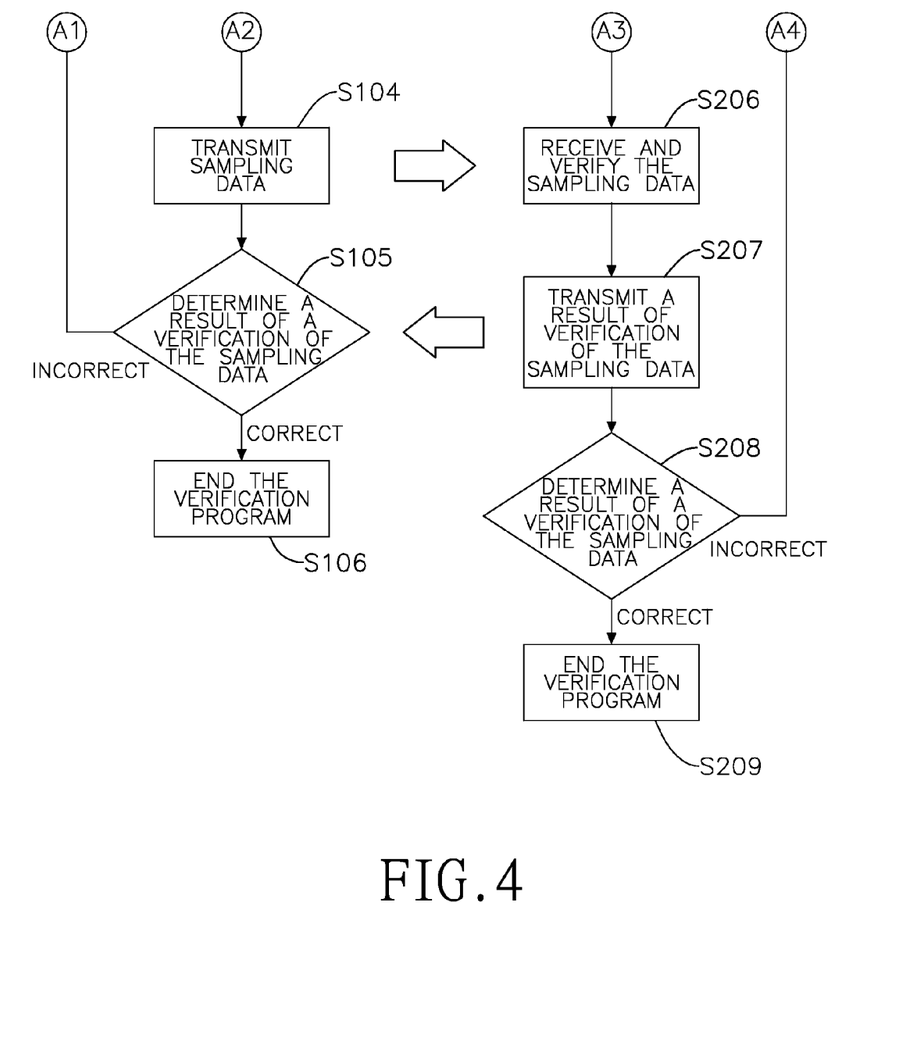

With reference to FIGS. 3 and 4, a flow diagram of a first embodiment of a boot verification procedure is shown. When the mobile device 20 executes the verification program, the user can input the sampling data (S101), and the mobile device 20 wirelessly connects to the electronic device 10. When the mobile device 20 wirelessly connects to the electronic device 10, the mobile device 20 transmits the device identification to the mobile device 20 (S102).

When the electronic device 10 receives the boot signal (S201), the electronic device 10 executes the boot firmware (S202). The electronic device 10 wirelessly connects to the mobile device 20 and reads the device identification of the mobile device 20 (S203). The electronic device 10 compares the device identification with the identification number to verify the device identification, and transmits a result of verification of the device identification to the mobile device 20 (S204). In other words, when the device identification is correct, the electronic device 10 transmits a correct signal to the mobile device 20.

The mobile device 20 determines the result of the verification of the device identification (S103). When the result of the verification of the device identification is correct, the mobile device 20 transmits the sampling data to the electronic device 10 (S104). When the result of the verification of the device identification is incorrect, the mobile device 20 transmits the device identification again (S102).

When the electronic device 10 transmits the result of verification of the device identification to the mobile device 20 (S204), the electronic device 10 further determines the result of the verification of the device identification (S205). When the result of the verification of the device identification is correct, the electronic device 10 reads the sampling data from the mobile device 20, and the electronic device 10 verifies the sampling data (S206). The electronic device 10 further transmits a result of verification of the sampling data to the mobile device 20 (S207). When the result of the verification of the device identification is incorrect, the electronic device 10 reads the device identification of the mobile device 20 again (S203).

When the mobile device 20 transmits the sampling data to the electronic device 10 (S104), the mobile device 20 determines the result of the verification of the sampling data (S105). When the result of the verification of the sampling data is correct, the verification program ends (S106). When the result of the verification of the sampling data is incorrect, the mobile device 20 transmits the device identification again (S102).

When the electronic device 10 transmits the result of verification of the sampling data to the mobile device 20 (S207), the electronic device 10 further determines the result of the verification of the sampling data (S208). When the result of the verification of the sampling data is correct, the electronic device 10 reads and executes the operation system (S209). When the result of the verification of the sampling data is incorrect, the electronic device 10 reads the device identification of the mobile device 20 again (S203).

In the first embodiment of the boot verification procedure, the electronic device 10 verifies the device identification and the sampling data. When the result of the verification of the device identification or the sampling data is incorrect, the electronic device 10 verifies the device identification and the sampling data again. The electronic device 10 does not execute the operation system until the result of the verification of the device identification and the sampling data is correct. The user cannot read the information saved in the electronic device 10 unless the verification of the device identification and the sampling data is correct Therefore, the information saved in the electronic device 10 can be protected by two factor authentication.

Figure 5:
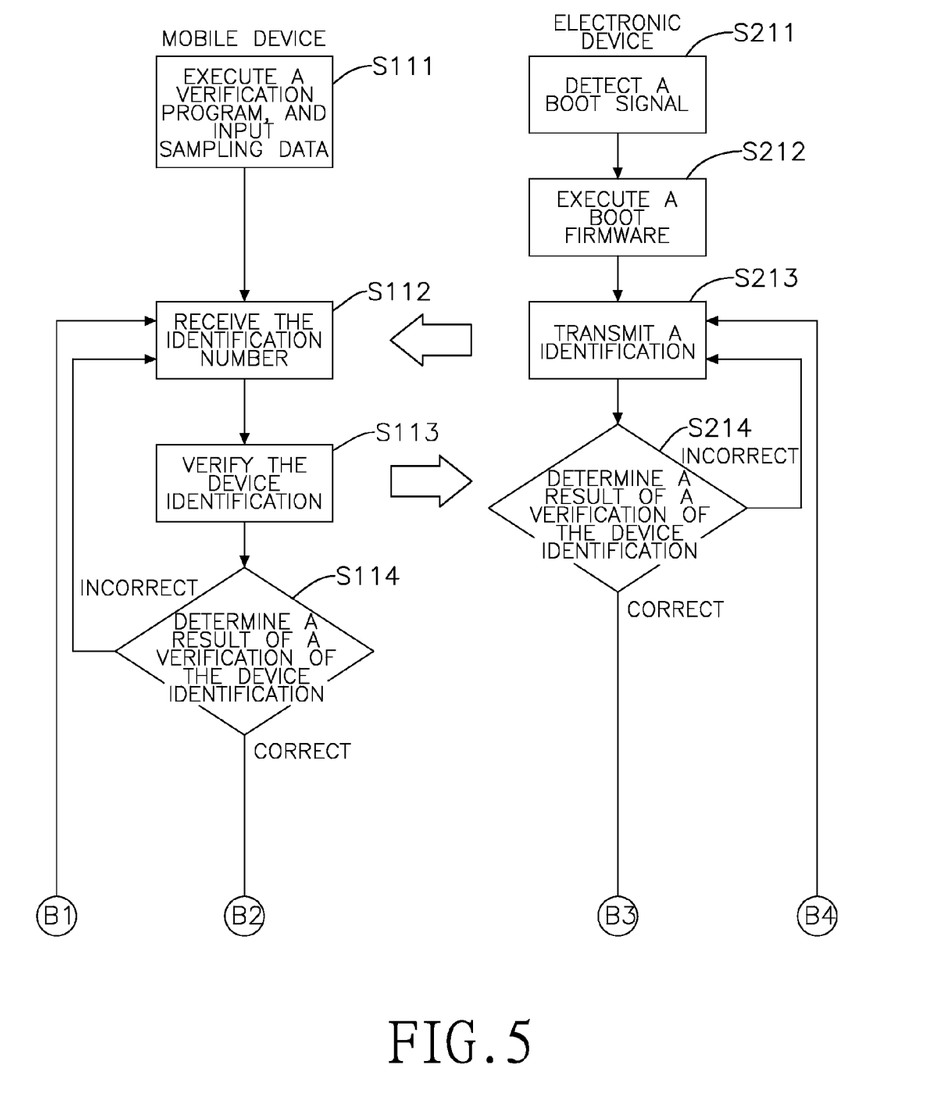
FIGS. 5 and 6 is flow diagrams of a second embodiment of an electronic system having a function of wake up verification.
Figure 6:
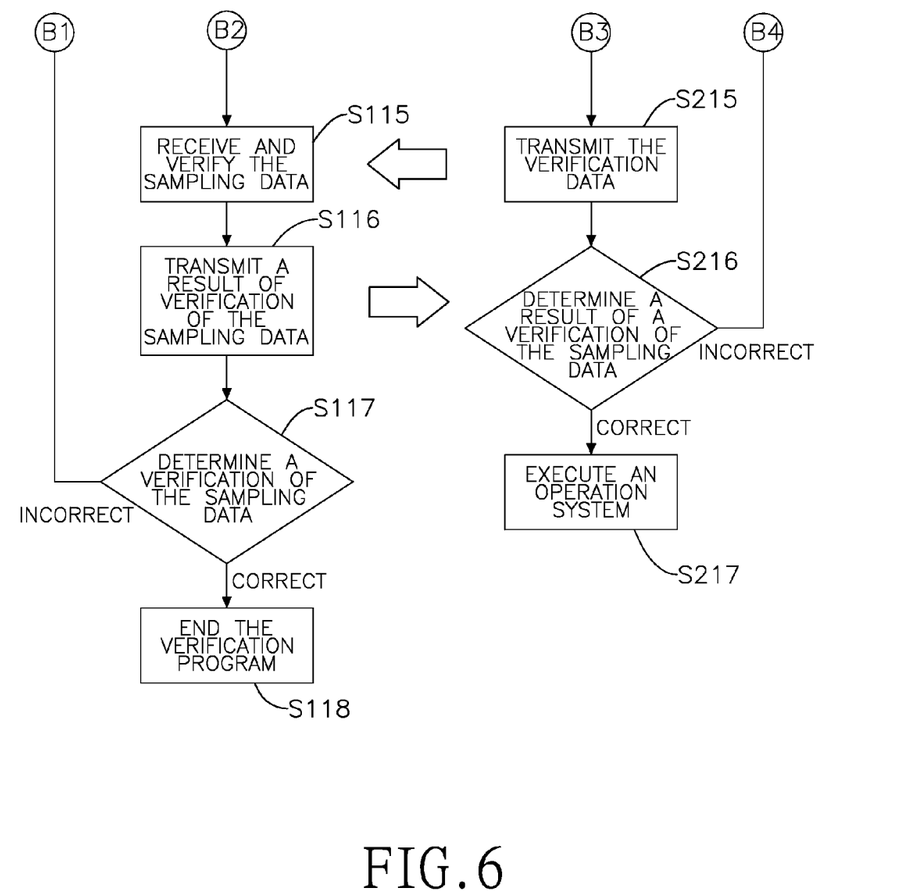

With reference to FIGS. 5 and 6, a flow diagram of a second embodiment of the boot verification procedure is shown When the mobile device 20 executes the verification program, the user can input the sampling data (S111).

When the electronic device 10 receives the boot signal (S211), the electronic device 10 executes the boot firmware (S212). The electronic device 10 wirelessly connects to the mobile device 20, and transmits the identification number saved in the first storage unit 11 to the mobile device 20 (S213).

The mobile device 20 wirelessly connects to the electronic device 10, and reads the identification number from the electronic device 10 (S112). The mobile device 20 further compares the device identification with the identification number to verify the device identification, and transmits a result of verification of the device identification to the electronic device 10 (S113). In other words, when the device identification is correct, the mobile device 20 transmits a correct signal to the electronic device 10.

The electronic device 10 determines the result of the verification of the device identification (S214). When the result of the verification of the device identification is correct, the electronic device 10 transmits the verification data to the mobile device 20 (S215). When the result of the verification of the device identification is incorrect, the electronic device 10 transmits the identification number to the mobile device 20 again (S213).

When the mobile device 20 transmits the result of verification of the device identification to the electronic device 10 (S113), the mobile device 20 further determines the result of the verification of the device identification (S114). When the result of the verification of the device identification is correct, the mobile device 20 reads the verification data from the electronic device 10, and the mobile device 20 verifies the sampling data (S115). The mobile device 20 further transmits a result of verification of the sampling data to the electronic device 10 (S116). When the result of the verification of the device identification is incorrect, the mobile device 20 reads the identification number from the electronic device 10 again (S112). The mobile device 20 further determines the result of the verification of the sampling data (S117). When the result of the verification of the sampling data is correct, the verification program ends (S118). When the result of the verification of the sampling data is incorrect, the mobile device 20 reads the identification number from the electronic device 10 again (S112).

When the electronic device 10 transmits the verification data to the mobile device 20 (S215), the electronic device 10 determines the result of the verification of the sampling data (S216). When the result of the verification of the sampling data is correct, the electronic device 10 reads and executes the operation system (S217). When the result of the verification of the sampling data is incorrect, the electronic device 10 transmits the identification number to the mobile device 20 again (S213).

Figure 7:
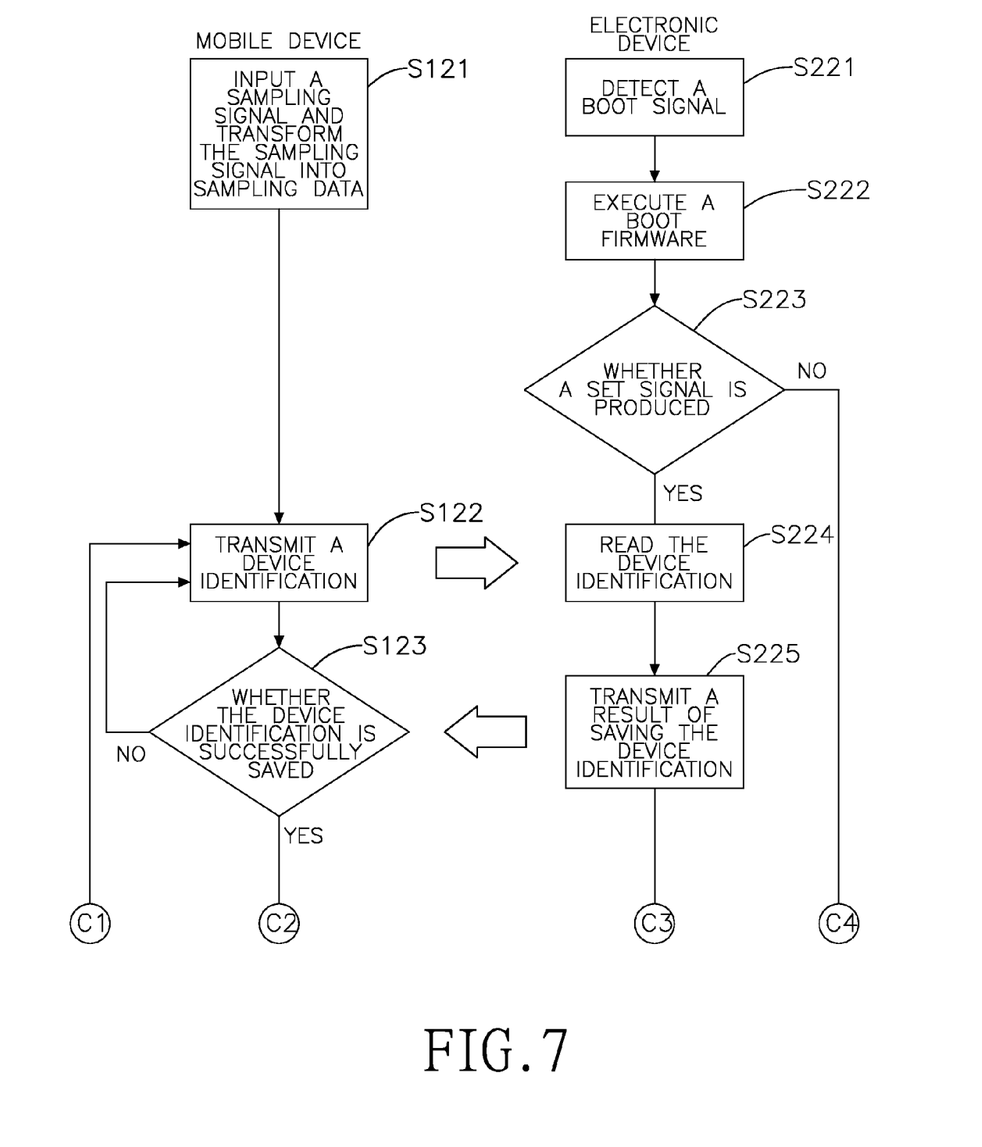
FIGS. 7 and 8 is flow diagrams of an electronic system having a function of wake up verification, showing the process of obtaining verification data.
Figure 8:
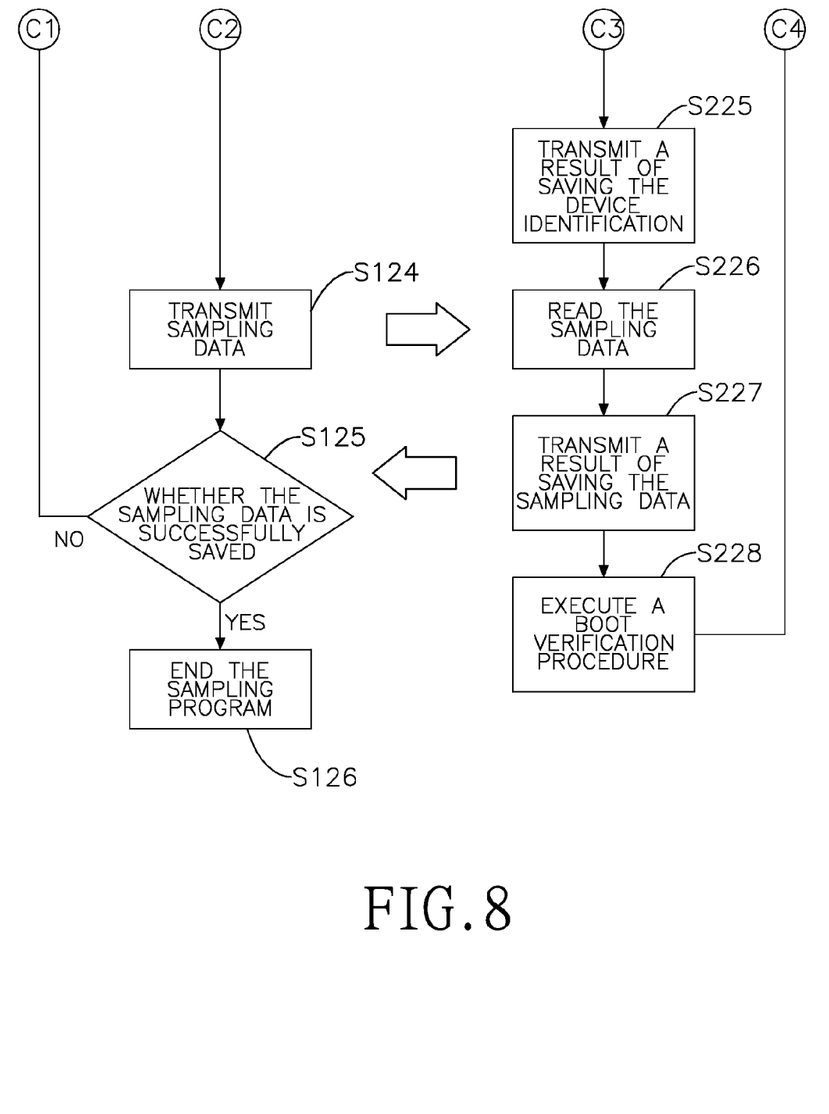

With reference to FIGS. 7 and 8, when the first storage unit 11 of the electronic device 10 does not store verification data or the user wants to change the verification data stored in the first storage unit 11, the electronic device 10 needs to update the verification data.

When the electronic device 10 needs to sample the sampling data, the mobile device 20 executes a sampling program and provides a sampling signal input interface on which the user can input the sampling signal. The user inputs the sampling signal on the sampling signal input interface, and the mobile device 20 transforms the sampling signal into the sampling data (S121). The mobile device 20 wirelessly connects to the electronic device 10, and transmits the device identification to the electronic device 10 (S122).

When the electronic device 10 receives the boot signal (S221), the electronic device 10 executes the boot firmware (S222) and detect whether a set signal is generated (S223). For example, the set signal is generated by pressing a particular button on a key board. When the electronic device 10 detects the set signal, the electronic device 10 executes a sampling data setting procedure. In the sampling data setting procedure, the electronic device 10 wirelessly connects to the mobile device 20, and reads a device identification of the mobile device 20 which is operating the sampling program (S224). The electronic device 10 saves the device identification of the mobile device 20, which is operating the sampling program into the first storage unit 11, and transmits a result of saving the device identification to the mobile device 20 (S225). When the electronic device 10 does not detect the set signal, the electronic device 10 executes the boot verification procedure.

The mobile device 20 determines whether the device identification is successfully saved into the electronic device 10 according to the result of saving the device identification (S123). When the device identification is saved into the electronic device 10, the mobile device 20 transmits the sampling data to the electronic device 10 (S124). When the device identification is not saved into the electronic device 10, the mobile device 20 transmits the device identification to the electronic device 10 again (S122).

When the electronic device 10 transmits the result of saving the device identification to the mobile device 20 (S225), the electronic device 10 reads the sampling data from the mobile device 20 (S226). The electronic device 10 further stores the sampling data as the verification data into the first storage unit 11, and transmits a result of saving the sampling data to the mobile device 20 (S227). Then, the electronic device 10 executes the boot verification procedure (S228).

When the mobile device 20 transmits the sampling data to the electronic device 10 (S124), the mobile device 20 determines whether the sampling data is successfully saved into the electronic device 10 according to the result of saving the sampling data (S125).

When the sampling data is saved into the electronic device 10, the mobile device 20 ends the sampling program (S126). When the sampling data is not saved into the electronic device 10, the mobile device 20 transmits the device identification to the electronic device 10 again (S122).

When the electronic device 10 executes the operation system, the electronic device 10 periodically detects wireless connection between the electronic device 10 and the mobile device 20. When the electronic device 10 is disconnected from the mobile device 20, the electronic device 10 is shut down or enters a standby mode. In other words, when the mobile device 20 is moved out of the effective area of wireless connection between the electronic device 10 and the mobile device 20, the processor 15 of the electronic device 10 shuts down the electronic device 10 to prevent other persons from using the electronic device 10.

The sampling unit 21 of the mobile device 20 may be integrated into the electronic device 10. Therefore, the user can input the sampling signal at the electronic device 10, and the mobile device 20 only transmits the device identification to the electronic device 10. Then the electronic device 10 verifies the device identification read from the mobile device 20, and verifies the sampling data received from the sampling unit 21 integrated with the electronic device 10.

The user can input the sampling signal at the mobile device 20, and the electronic device 10 can verify the device identification and the sampling data read from the mobile device 20. When the two factor authentication is successful, the electronic device 10 executes the operation system. The information saved in the electronic device 10 cannot be easily accessed and stolen by other persons. The two factor authentication maintains confidentiality of the information at a high level.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An electronic device having wake up verification, comprising:
   a first storage unit configured to store verification data;
   a second storage unit configured to store an operation system;
   a wireless module configured to wirelessly connect to a mobile device;
   an embedded controller configured to detect a boot signal; and
   a processor electrically connected to the first storage unit, the second storage unit, the wireless module, and the embedded controller;
   wherein when the embedded controller detects the boot signal, the processor executes a boot firmware and wirelessly connects to the mobile device through the wireless module to read sampling data sampled by the mobile device from the mobile device, and the processor further compares the sampling data with the verification data to verify the sampling data;
   wherein the sampling data is generated according to location based service (LBS) information detected by a positioning unit of the mobile device,
   wherein the processor determines whether the mobile device and the electronic device are both in a pre-defined location according to the sampling data,
   wherein when the mobile device and the electronic device are both in the pre-defined location, the processor executes the operation system, and
   wherein the boot firmware is a basic input/output system (BIOS) firmware, a unified extensible firmware interface (UEFI) BIOS firmware, or an OS boot loader firmware.

2. The electronic device as claimed in claim 1, wherein:
   the first storage unit further stores an identification number;
   when the processor wirelessly connects to the mobile device through the wireless module, the processor firstly reads a device identification of the mobile device and compares the device identification with the identification number to verify the device identification;

when the device identification is same as the identification number stored in the first storage unit, the processor reads the sampling data from the mobile device.

3. The electronic device as claimed in claim 1, wherein a communication protocol between the mobile device and the wireless module is near field communication (NFC), Wi-Fi, or Bluetooth.

4. The electronic device as claimed in claim 1, further comprising a network card configured to be electrically connected to the embedded controller;

wherein when the network card receives a boot packet from a remote device, the network card generates the boot signal and transmits the boot signal to the embedded controller.

5. The electronic device as claimed in claim 1, wherein the processor further detects wireless connection between the electronic device and the mobile device;

wherein when the electronic device is disconnected from the mobile device, the electronic device is shut down or enters a standby mode.

6. The electronic device as claimed in claim 1, wherein the sampling data is generated according to a verification gesture detected by a touch screen, a gravity sensing signal detected by a g-sensor, a light sensing signal detected by a light sensor, an image captured by an image capturing unit, a fingerprint recognized by a fingerprint recognition unit, or a voiceprint recognized by a voiceprint recognition unit.

7. An electronic system having wake up verification, comprising:
a mobile device; and
an electronic device configured to comprise:
a first storage unit configured to store verification data;
a second storage unit configured to store an operation system;
a wireless module configured to wirelessly connect to the mobile device;
an embedded controller configured to detect a boot signal; and
a processor electrically connected to the first storage unit, the second storage unit, the wireless module, and the embedded controller,
wherein when the embedded controller detects the boot signal, the processor executes a boot firmware and wirelessly connects to the mobile device through the wireless module to read a sampling data from the mobile device, and the processor further compares the sampling data with the verification data stored in the first storage unit to verify the sampling data,
wherein the boot firmware is a basic input/output system (BIOS) firmware, a unified extensible firmware interface (UEFI) BIOS firmware, or an OS boot loader firmware,
wherein the sampling data is generated according to location based service (LBS) information detected by a positioning unit of the mobile device,
wherein the processor determines whether the mobile device and the electronic device are both in a pre-defined location according to the sampling data, and wherein when the mobile device and the electronic device are both in the pre-defined location, the processor executes the operation system stored in the second storage unit.

8. The electronic system as claimed in claim 7, wherein the mobile device comprises:
at least one sampling unit configured to generate a sampling signal;
a wireless unit configured to be wirelessly connected to the wireless module of the electronic device;
a processing unit configured to be electrically connected to the sampling unit and the wireless unit;
wherein the processing unit generates the sampling data according to the sampling signal, and transmits the sampling data to the electronic device through the wireless unit.

9. The electronic system as claimed in claim 8, wherein:
the mobile device comprises a storage unit which stores a device identification;
the first storage unit of the electronic device further stores an identification number;
wherein when the processor of the electronic device wirelessly connects to the mobile device through the wireless module, the processor of the electronic device firstly reads the device identification from the mobile device and compares the device identification with the identification number to verify the device identification;
when the device identification is same as the identification number stored in the first storage unit, the processor of the electronic device reads the sampling data from the mobile device.

10. The electronic system as claimed in claim 8, wherein the sampling unit of the mobile device is a g-sensor, and the g-sensor detects a gravity sensing signal and generates the sampling signal according to the gravity sensing signal.

11. The electronic system as claimed in claim 8, wherein the sampling unit of the mobile device is an image capturing unit, and the image capturing unit captures an image and generates the sampling signal according to the image.

12. The electronic system as claimed in claim 8, wherein the sampling unit of the mobile device is a fingerprint recognition unit, and the fingerprint recognition unit recognizes a fingerprint and generates the sampling signal according to the fingerprint.

13. The electronic system as claimed in claim 8, wherein the sampling unit of the mobile device is a positioning unit, and the positioning unit detects location based services (LBS) information of the mobile device and generates the sampling signal according to the LBS information.

14. The electronic system as claimed in claim 13, wherein the positioning unit is a GPS module, and when the mobile device and the electronic device are both in the pre-defined location, the sampling data is same as the verification data.

15. The electronic system as claimed in claim 8, wherein the sampling unit of the mobile device is a voiceprint recognition unit, and the voiceprint recognition unit recognizes a voiceprint and generates the sampling signal according to the voiceprint.

* * * * *